Dec. 4, 1945. M. PIOT 2,390,168
DEVICE FOR CLAMPING MEMBERS TO SHAFTS
Filed Oct. 15, 1941

Inventor:
MARIUS PIOT
By Haseltine Lake & Co.
Attorneys

Patented Dec. 4, 1945

2,390,168

UNITED STATES PATENT OFFICE 2,390,168

DEVICE FOR CLAMPING MEMBERS TO SHAFTS

Marius Piot, Roanne, France; vested in the Alien Property Custodian

Application October 15, 1941, Serial No. 415,056
In France September 27, 1940

6 Claims. (Cl. 287—53)

Heretofore pinions, pulleys, cams, levers or similar members comprising a bored or ring-shaped part have been generally clamped to their supporting shaft by means of one or several keys or feathers. Such clamping means is defective in numerous instances, particularly in the case of machines whose power or efficiency undergoes large variations because members keyed to the shaft rapidly wear away owing to the frequent reactional strains due to power fluctuations, so that after a relatively short period of time due to repeated shocks or jerks, such members become loose upon the shaft, their bore becoming oval while the keyway grows to a state of distortion. Moreover, the outset of the wear does not appear early enough to permit such distortion being precluded so that the shaft and pinion or other member carried thereby rapidly become unfit for further operation and must be discarded. The substitution of new parts entails considerable expense both in material and in time. This occurs particularly in the typical case of pinions such as those mounted on shafts associated with motors utilised for individually driving looms, compressors and other machines whose efficiency chart line has a sawtooth or jagged outline.

An object of the present invention is to provide an improved device for clamping a member such as a pinion, pulley, cam, eccentric, lever, link, sleeve or the like (hereafter called "member") to a shaft, axle or arbor (hereafter called "shaft") while avoiding the aforesaid disadvantages particularly in case of machines or apparatus whose efficiency or kinetic output undergoes large operational variations or fluctuations.

Another object of the invention is to provide a device for clamping a member as aforesaid to any convenient part of a supporting shaft (whether driving or driven), said device being also applicable to the elastic coupling end to end of a pair of co-related shafts and enabling an offsetting of said shafts where required.

Another object of the invention is to provide a device for so clamping a shaft to a member having a hollow boss, hub or other bored part encompassing said shaft as to set up proper diametrical thrusts for adequately transferring from the one to the other the stresses which must be transmitted.

Another object of the invention is to provide a device for clamping a member to a shaft by resilient means and under such conditions as to automatically and permanently preserve that minimum degree of compression on said resilient means which is required for interlocking them and enabling proper power transmission.

Still another object of the invention is to provide a device ensuring a very steady and stable clamping of the member on the shaft or like carrier and while at the same time absorbing shocks, jerks or jogs and the concomitant causes of wear and tear on the parts that are clamped together.

A further object of the invention is to provide a device for securely clamping a member to a shaft without requiring keys, feathers or pins, whereby shafts or hubs of smaller cross sectional area may be used without impairing reliability of transmission, while lessening unit pressures on the shaft and member due to adequate distribution of the total pressure throughout their matched surfaces.

With these and such other objects in view as will incidentally appear hereinafter, the invention comprises the novel construction, combination and arrangement of parts that will now be more fully described with reference to the accompanying diagrammatic drawing exemplifying embodiments of the same and forming a part of the present disclosure.

In the drawing.

Like reference numerals designate like parts throughout the several views.

Figure 1:
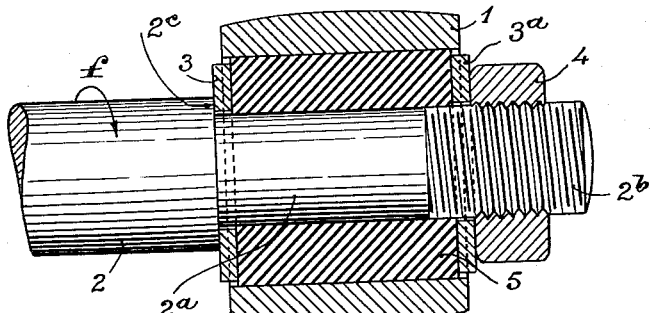
Figure 1 is a longitudinal sectional view of a first embodiment of the invention as applied to the clamping of a pulley to the screw-threaded end of a shaft engaged therethrough, the clamping being performed by means of a sleeve and a pair of nut-pressed washers.

Reference being first had to Fig. 1, it will be seen that the device according to the invention is intended to clamp a hollow ring-shaped member such as a pulley or block 1 to the reduced end 2a of a supporting shaft 2 which may be either a driving or a driven shaft. The free extremity of the reduced end 2a of this shaft is screw-threaded as at 2b. A pair of washers 3, 3a are fitted over the reduced end 2a of the shaft, and a nut 4 is engaged over the screw-threaded extremity. The clearance or free space between the inner surface of the pulley 1 and the reduced end 2a of the shaft 2 is filled up by a solid sleeve or annular interponent 5 made of a plastic, yielding and resilient substance such as rubber or a rubberized or equivalently endowed stuff. As will be seen, in operative position, the plastic sleeve 5 is interposed between the washers 3, 3a and can be imparted any requisite degree of compression by screwing up the nut 4.

Figure 2:
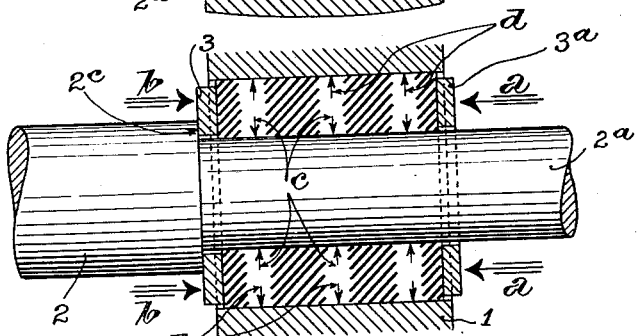
Figure 2 is a view somewhat similar to Fig. 1 (the screw thread being omitted for the sake of clearness) showing diagrammatically by arrows the directions of the forces exerting themselves on the washers and on the shaft and member through the plastic sleeve interposed therebetween.

As will be understood from an inspection of Figs. 1 and 2, when the nut 4 is screwed up, as the left hand side washer 3 is firmly held in position by abutting against the shoulder 2c formed at the outset of the reduced portion 2a of the shaft 2, the plastic sleeve 5 is compressed between the two washers, whence it receives (as illustrated by the arrows a, a, b, b) bilateral pressures the result of which is to distort said sleeve, i. e. to increase its diametrical size while decreasing its longitudinal size. This distortion or "swelling" of the plastic sleeve or interponent 5 gives rise to a diametrical thrust both inwardly on the shaft (as shown by the arrows c, c) and outwardly on the inner face of the pulley (as shown by the arrows d, d).

Such thrust increases when the nut 4 (Fig. 1) is further screwed up and the washers 3, 3a are tightened to a greater extent. The intensity of this thrust exerting itself both inwardly and outwardly is sufficient for ensuring such an adhesion as to firmly clamp together the shaft and pulley while preserving their matched surfaces from wear since any mutual friction or attrition thereof is precluded by the presence of the interponent 5 which also acts as a protective lining. As will be understood, the compression of the resilient substance of which the interponent 5 is made performs a permanent self-locking effect so that interdrive between the shaft and pulley or equivalent member (such as another shaft in case of line shafting) is properly ensured.

As the shaft 2 rotates in the direction shown by the arrow f in Fig. 1, it will be understood that owing to the resiliency of the plastic sleeve 5 and the resisting to the driving action, there occurs a certain amount of lag between the shaft and the driven member 1 and consequently an instantaneous partial drive of the nut 4 since its driving torque by the plastic sleeve 5 and the washers 3, 3a is always larger than the negative torque exerted by the screw threads.

Figure 3:
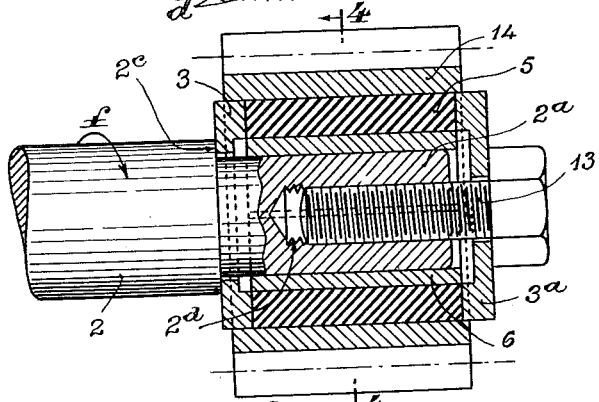
Figure 3 is a longitudinal sectional view on the line 3—3 of Fig. 4 showing another embodiment of the invention as applied to the clamping of a pinion or cogged wheel to the end of a shaft.
Figure 4:
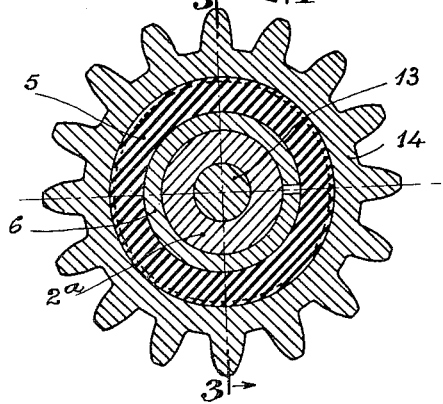
Figure 4 is a cross sectional view on the line 4—4 of Fig. 3.

Reference being now had to Figs. 3 and 4, it will be seen that there is shown in them a modification of the device applicable to constructions in which the dismantling of a member removably fitted to the end of a shaft has to be effected easily and quickly as for example when said member is a pinion or a cogged wheel such as 14 adapted to be revolved by a driving shaft 2 having a reduced end 2a defining a shoulder 2c.

This constructional modification of the device includes in combination with the plastic or resilient sleeve 5 a slotted bushing 6 preferably made of soft steel or equivalent metal or alloy and having a length smaller than that of said sleeve 5 when the latter is not compressed. The bushing 6 is interposed between the sleeve 5 and the reduced end 2a of the shaft 2. Instead of being externally screw-threaded as shown as 2b in the form illustrated in Figs. 1 and 2, the reduced end 2a of the shaft is internally bored and tapped as shown at 2d to receive the shank of a screw 13 whose head presses the adjacent washer 3a against the side face of the plastic sleeve 5.

It will be understood that by tightening up the screw 13, the pressure exerted thereby is communicated through the adjacent washer 3a. This squeezes lengthwise the plastic sleeve 5 whose remote side face is clamped against the oppositely disposed washer 3 while radially swelling said sleeve against the metallic bushing 6 and against the inner face of the pinion or other member 14. By adequately tightening up the screw 13, the pressure thus exerted by the plastic sleeve 5 against the bushing 6 and pinion 14 may be rendered large enough to provide such a perfect adhesion and interlocking as to ensure a strong and steady interdrive between the driving shaft 2 and the driven pinion 14. At the same time, owing to its plastic or resilient character, the interponent or sleeve 5 absorbs shocks or jerks and lessens reactional or back lash stresses and protects the shaft and pinion from undue wear or breakage. Self-locking is obtained as in the constructional form shown in Figs. 1 and 2.

It will be understood that the invention is not restricted to the constructional forms shown and described by way of non-limitative examples. Thus for example the plastic or resilient sleeve may be formed in one piece or in several pieces and its shape may differ from that of a cylindrical annulus. All such variations are included in the ambit of the word "interponent" used in the subjoined claims whose scope should be construed in a broad sense.

What is claimed is:

1. A device for clamping together a shaft having a reduced end defining a shoulder and provided with a tapped bore, and a ring-shaped member engageable over said end, comprising a resilient and plastic annular interponent freely inserted through the clearance between the shaft and member, a bushing intermediate the shaft and interponent, a pair of washers contacting with the opposite ends of said interponent and defining in cooperation with said member and bushing an enclosure filled up by the interponent, one of said washers being abutted against said shoulder, and a screw having its shank engaging the tapped bore and its head contacting the opposite washer, said screw squeezing the interponent between the washers and elastically swelling it into firm drive-transmitting grip with the bushing and member.

2. A device for clamping together a shaft having a reduced end defining a shoulder and provided with a tapped bore, and a ring-shaped member engageable over said end, comprising a rubber sleeve freely inserted through the clearance between the shaft and member, a soft iron slotted bushing of smaller length than the sleeve arranged intermediate the shaft and sleeve, a pair of washers contacting with the opposite flank ends of said sleeve and defining in cooperation with the member and bushing an enclosure filled up by the interponent, one of said washers being abutted against said shoulder, and a screw having its shank engaged in the tapped bore and its radially projecting head contacting the opposite washer, said screw squeezing the sleeve between the washers and elastically expanding it into firm drive-transmitting gripping engagement with the bushing and the inner face of the member.

3. In combination, a shaft having a reduced screw-threaded end, a member having a ring-shaped portion engageable over said end, a rubber sleeve between the shaft and member, a slotted metallic bushing between the sleeve and shaft, and gradually acting means including abutments and a screwed part engageable with the screw-threaded end for squeezing the sleeve lengthwise and progressively expanding it in the radial direction into firm drive-transmitting engagement with the shaft and member, said means cooperating with the bushing and member to define an enclosure filled up by the rubber sleeve.

4. In combination, a shaft having a reduced inwardly screw-threaded end, a member having a ring-shaped portion engageable over said end for operative connection therewith, a rubber sleeve between the shaft and member, a slotted bushing made of soft iron and having a smaller length than the sleeve, said bushing being interposed between the shaft and sleeve, and gradually acting means including abutment washers and a screw engageable into said inwardly screw-threaded end for squeezing the sleeve lengthwise and progressively expanding it radially into firm drive-transmitting grip with the periphery of the bushing and the inner face of the member, said means cooperating with the bushing and member to define a tight enclosure filled up by the rubber sleeve.

5. In combination, a shaft, a contractible bushing arranged on said shaft, a member having a bore therein arranged around the bushing, the inner periphery of said bore being disposed in spaced relation to the outer periphery of said bushing, means cooperating with said member and bushing for closing the ends of said bore to form an enclosure, a single solid resilient and plastic interponent encased intermediate the shaft and bushing and filling up said enclosure, an adjustable means engageable with said cooperating means for compressing said interponent lengthwise from both ends whereby said interponent will be expanded inwardly and outwardly into firm driving engagement with the contractible bushing and member respectively.

6. In combination, a shaft, a soft metallic slotted bushing arranged on said shaft, a member having a bore therein arranged around the bushing, the inner periphery of said bore being disposed in spaced relation to the outer periphery of said bushing, means cooperating with the member and bushing for closing the ends of said bore to form an enclosure, a resilient single solid interponent encased intermediate the bushing and member and filling up said enclosure, and means independent of said member for compressing said interponent lengthwise from both ends to thereby elastically distort and expand the interponent radially outwardly into firm driving engagement with the member, and to simultaneously expand the interponent radially inwardly against the outer periphery of said slotted bushing.

MARIUS PIOT.